Feb. 24, 1970     W. D. BOYER     3,496,921
CAPACITIVE STORAGE IGNITION SYSTEM
Filed Aug. 1, 1968     2 Sheets-Sheet 1
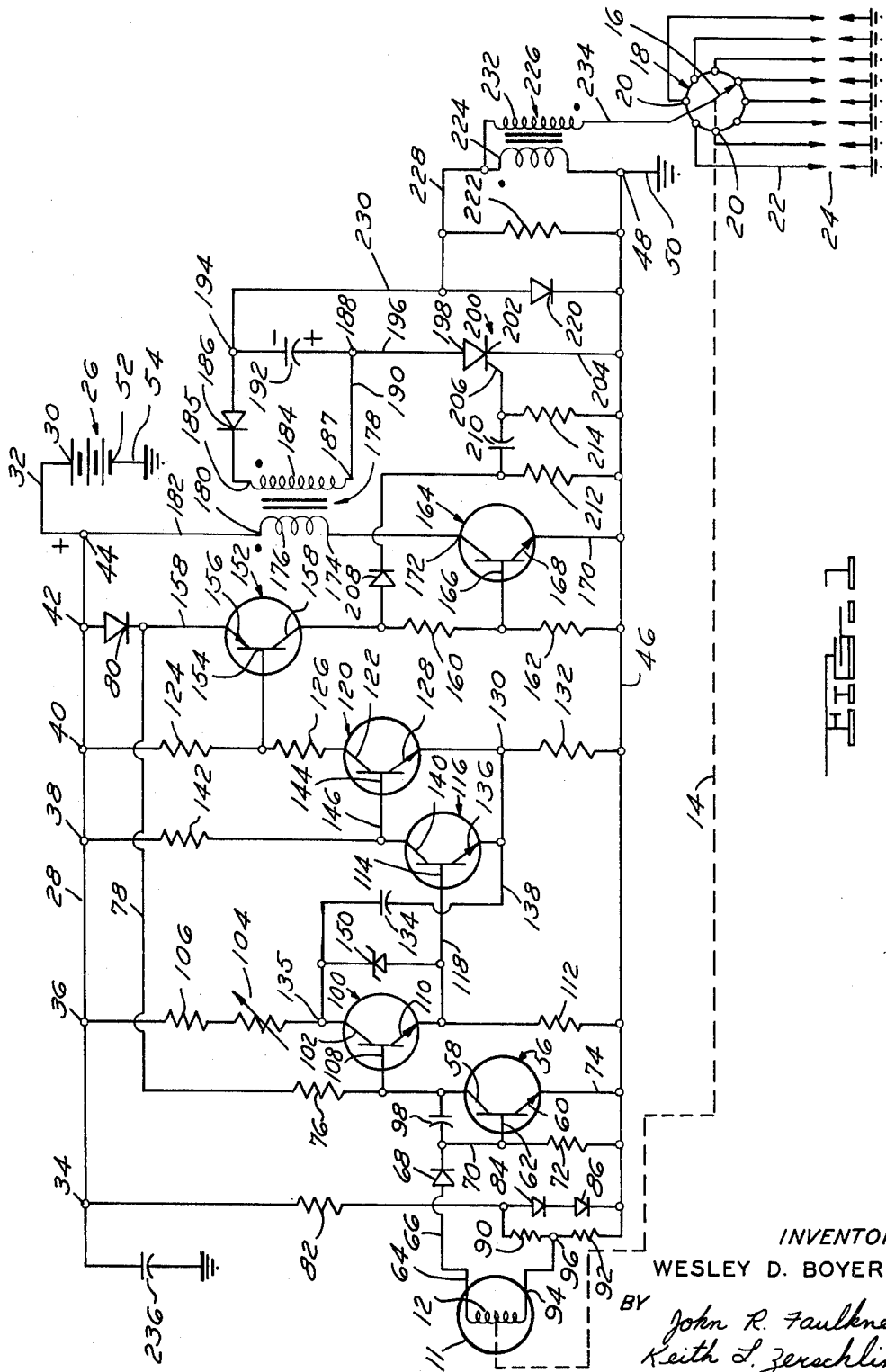
INVENTOR
WESLEY D. BOYER
BY
John R. Faulkner
Keith L. Zerschling
ATTORNEYS Feb. 24, 1970  W. D. BOYER  3,496,921
CAPACITIVE STORAGE IGNITION SYSTEM
Filed Aug. 1, 1968  2 Sheets-Sheet 2
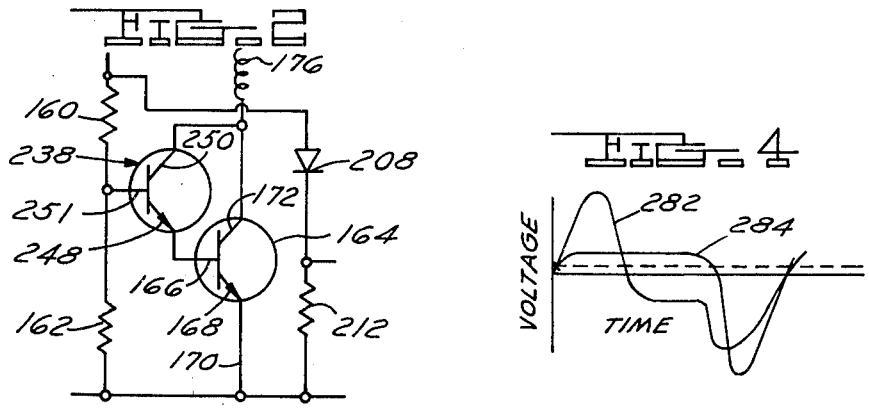
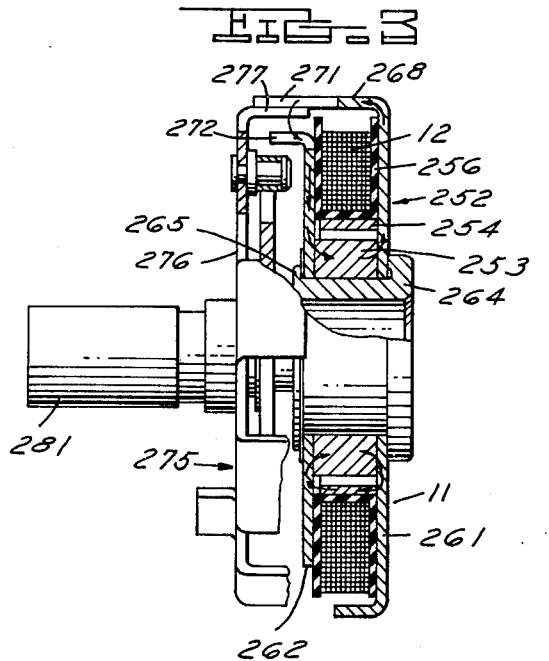
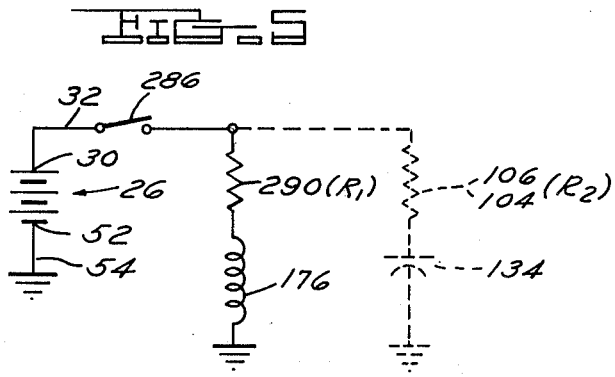
INVENTOR
WESLEY D. BOYER
BY
John R. Faulkner
Keith L. Zerschling
ATTORNEYS United States Patent Office 3,496,921
Patented Feb. 24, 1970

3,496,921
CAPACITIVE STORAGE IGNITION SYSTEM
Wesley D. Boyer, Franklin, Mich., assignor to Ford
Motor Company, Dearborn, Mich., a corporation
of Delaware
Filed Aug. 1, 1968, Ser. No. 749,466
Int. Cl. F02p 3/06; H05b 37/02, 39/04
U.S. Cl. 123—148
11 Claims

ABSTRACT OF THE DISCLOSURE

An ignition system for an internal combustion engine in which energy to be stored in a capacitor flows through an inductor coupled to a vehicle storage battery. The inductor is connected to a switching means which interrupts current through the inductor periodically and the energy represented by current flow through the inductor is stored in a capacitive device to later be used to produce ignition voltages at the spark plugs of the engine. A sensing circuit comprising a capacitor and resistor network having a time constant substantially equal to the time constant of the series circuit including the inductor is employed to switch the switching means to a nonconducting state when the voltage stored across the capacitor reaches a predetermined value. The voltage across the capacitor and the current in the inductor are so related that proper levels of electrical energy are stored in the inductor over wide ranges of input voltages to the system and over a wide speed range of the engine. The energy charge delivered to the spark plugs is thus independent of wide input voltage fluctuations and independent of engine speed over a wide speed range of the engine. This is accomplished by charging the capacitor to a predetermined voltage level which matches a predetermined or desired current level through the inductor.

Background of the invention

The prior art is replete with ignition systems that store inductive electrical energy in an inductor which is then, at a predetermined time, delivered to the spark plugs of the internal combustion engine for igniting a combustible mixture present in the cylinders of the engine. There are also many so-called "capacitive storage ignition systems" in the prior art in which current through an inductor is interrupted and the electrical energy of this current is then stored in a capacitor. The capacitor is discharged through the primary winding of the ignition coil of the ignition system in timed relationship with the rotation of the engine. This results in high secondary voltages in the secondary winding of the ignition coil that are applied to the spark plugs.

A very desirable feature of any ignition system is the provision of a substantially constant voltage at the spark plugs independent of wide fluctuations or variations in the input voltage applied to the system from the storage battery of the vehicle. The electrical storage battery of a vehicle may have output voltages ranging over wide levels. For example, the output voltage from a nominal 12 volt battery may fall to five volts during cranking operations at low temperatures where ignition voltages should be high, and may rise to fairly high levels established by the voltage regulator of the vehicle, for example 14 to 15 volts, when the engine is operating normally.

In certain prior art known to the applicant, a capacitive storage system is provided in which the energy to be discharged through the primary winding of the ignition coil is stored in a capacitor. A controlled rectifier receives a signal from a switching means that is operated in synchronism with the engine for discharging the energy stored in the capacitor through the primary winding of the ignition coil at the correct time during engine operation. This prior art includes means, for example, a transformer, in which the primary winding is connected through certain switching arrangements with the source of electrical energy of the vehicle, and the secondary winding is coupled to the capacitor. Means are provided in this prior art for sensing directly the current flow through the primary winding of the transformer and interrupting it when this current reaches a predetermined value. While these systems are satisfactory to provide fairly good regulation of the energy input into the primary winding of the ignition coil, they suffer from the disadvantage that the sensing signal that senses current through the primary winding of the transformer is lost as soon as the sensing signal senses the predetermined current through this primary winding and the current is cut off.

The present invention provides improved regulation of the electrical energy charge that is to be delivered to the spark plugs via a capacitor and the primary winding of the ignition coil, provides very stable operation, is less susceptible to false triggering or premature cutoff than the prior art systems and has simplified electronic circuitry. The electrical energy delivered to the spark plugs is substantially constant, and is independent of input voltage fluctuations, that is, fluctuations in the voltage applied from the vehicle battery to the system and independent of the speed of the engine over a wide speed range. This is accomplished by using a charging capacitor that is charged to a given voltage level which matches a predetermined current cut-off level through an inductor. The capacitor remains charged despite the fact that the current through the inductor is cut-off to charge a storage capacitor connected to be discharged into the primary winding of the ignition coil. The predetermined voltage level on this capacitor will remain and hold the system in a stable state of operation until the system receives an input signal that will discharge the previously mentioned storage capacitor through the primary winding of the ignition coil.

Summary of the invention

This invention relates to an ignition system for an internal combustion engine in which energy derived from a source of electrical energy is stored in an inductor. The amount of energy stored in the inductor is determined by a voltage sensing device which interrupts current from the source of electrical energy to the inductor when current in the inductor reaches a predetermined value. The voltage sensing device is in the form of a capacitor which is charged through a charging resistance. When the voltage across the capacitor reaches a predetermined level, which corresponds to the predetermined value of current through the inductor, switching means coupled to the capacitor and to the inductor interrupts current flow through the inductor. Interruption of current flow through the inductor stores the inductive energy in a capacitor which is connected in series circuit with the primary winding of an ignition coil and with a solid state switching device such as a silicon controlled rectifier.

An input signal from an electrical mechanical generator is applied to a transistorized primary switching circuit which will cause a transistor connected in series with the charging resistance to be switched to its nonconducting state when the output from the electrical generator reaches a predetermined level. At this time a transistor connected in series with the inductor is switched to its conducting state. The capacitor coupled to the charging resistance then starts to charge toward a predetermined level which is set by means of the break-down voltage of a Zener diode coupled to the capacitor. The Zener breakdown voltage controls the level to which the capacitor charges and when the capacitor reaches this predetermined voltage level, the transistor connected in series with the inductor is turned to its nonconducting state thereby interrupting current through the inductor.

The interruption of current through the inductor causes a transfer, through a transformer, of the electrical energy stored in it to the storage capacitor previously mentioned.

When the input signal of the electrical generator rises to a predetermined level on the next cycle of operation, a signal in the form of a differentiated rectangular pulse from the collector of a transistor is applied to the gate of the solid state switch or controlled rectifier. The collector of this transistor is connected to the base of the transistor connected in series with the previously mentioned inductor. Conduction of the controlled rectifier causes the electrical energy stored on the storage capacitor to discharge through the primary winding of the ignition coil thereby causing high output voltages in the secondary winding of the ignition coil that are applied to spark plugs.

The energy stored in the inductor is substantially constant irrespective of changes in engine speed up to a predetermined speed level and irrespective of wide fluctuations in the input voltage from the storage battery or source of electrical energy. The energy stored therefore on the last mentioned capacitor is substantially constant. As a result, the energy delivered to the spark plugs is substantially constant over wide ranges of engine speed and wide fluctuations of battery voltage. This is accomplished since the sensing capacitor that charges through the previously mentioned resistors must charge to a predetermined level before current through the inductor is interrupted, and this charging to the predetermined level will be independent of engine speed over a wide speed range and independent of wide fluctuations of input voltage from the battery.

At high engine speeds this system may be over-ridden so that the firing of the silicon controlled rectifier may take place prior to the time that current through the inductor reaches a desired predetermined level. Under these conditions the output voltages from the secondary winding may fall as speed increases above a certain predetermined or critical speed, but in this speed range, the fall in voltage is comparable to a conventional ignition system.

Full output voltages are sustained however in the system of the present invention over a much greater speed range than with a conventional ignition system. This situation is perfectly satisfactory inasmuch as the engine traditionally requires less sparking voltages at higher speeds and temperatures and this feature limits power dissipation at higher speeds. Proper timing relationships, however, are maintained over the entire speed range.

Thus, the present invention provides a very uncomplicated, reliable system that employs a resistor-capacitive network to cut-off current flow through an inductor when that current flow reaches a predetermined level. The voltage level at which the capacitor cuts off current through the inductor is independent of speed over wide speed ranges of the engine and over wide variations and fluctuations in the voltage applied to the system from the vehicle electrical system. Moreover, the voltage across the capacitor, which is the sensing voltage for cutting off current flow through the inductor, is not lost and does not disappear when current is interrupted in the inductor. The voltage is maintained on the capacitor for a considerable period of time thereafter until the voltage from an electromechanical generator falls to a given level.

The present invention also eliminates any need for a sensing resistor coupled in series with the inductor that acts as the energy storage device for sensing the current through the inductor. The above described construction also provides improved regulation of the energy charge to the spark plugs, provides very stable operation, is less susceptible to false triggering or premature cut- off than prior art devices, and employs a very uncomplicated electronic circuit.

Brief description of the drawings

FIGURE 1 is a circuit diagram of the ignition system of this invention.

FIGURE 2 is a partial circuit diagram of a modified form of the ignition system shown in FIGURE 1.

FIGURE 3 is a sectional view partially in elevation of an electromagnetic generator used with the invention and operated in synchronism with the engine.

FIGURE 4 shows typical output wave forms of the output voltage from the electrical generator shown in FIGURE 3.

FIGURE 5 is a primary circuit analog of the circuit shown in FIGURE 1.

Description of the preferred embodiment

Referring now to the drawings in which like reference numerals designate like parts throughout the several views thereof, there is shown in FIGURE 1 a circuit diagram of the ignition system of the present invention in which an electrical generator 11 having an output winding 12 is employed to produce control signals or voltages to properly operate the circuit. As shown by the dashed line 14, this electrical generator 11 is driven in synchronism with a conductive rotating arm 16 of a distributor 18 by a rotating shaft of the engine (not shown). The distributor 18 includes, in addition to the rotating arm 16, a plurality of stationary electrical contacts 20 which are connected through suitable ignition wires 22 to the spark plugs 24 of the engine. Thus, as the conductive rotating arm 16 comes into contact with one of the contacts 20, electrical energy is delivered to one of the spark plugs 24 through one of the ignition wires 22. The distributor described above is conventional and further description of it is considered to be unnecessary.

A source of direct current electrical energy, for example, from the battery 26, is applied to line 28. This electrical energy has a positive polarity and is applied to line 28 from the positive terminal 30 of the battery 26 through a lead 32. The line 28 has a plurality of junctions 34, 36, 38, 40, 42 and 44 to which the various circuit components of the primary circuit of the ignition system are connected. The primary circuit also includes a line 46 which is connected to ground through a junction 48 and a lead 50 and hence to the negative terminal 52 of the battery 26 which is also connected to ground through a lead 54.

A first transistor 56 has a collector 58, an emitter 60 and a base 62. The base 62 is connected to terminal 64 of the output winding 12 of electrical generator 11 through lead 66, diode 68 and lead 70. The base 62 is also connected to line 46 and hence to ground through resistor 72. The emitter 60 of transistor 56 is connected to line 46 and hence to ground through lead 74, while the collector 58 is connected to line 28 and the positive terminal 30 of the battery 26 through a resistor 76, a lead 78 and a diode 80 which is connected in the forward conducting direction.

The junction 34, positioned in line 28, is connected to line 46 through resistor 82 and a pair of series connected diodes 84 and 86 which are shunted by a voltage divider comprising resistors 90 and 92. The other terminal 94 of the output winding 12 of the electrical generator 11 is connected to a junction 96 positioned between the resistors 90 and 92. Additionally, a capacitor 98 is connected between the base 62 and the collector 58 of transistor 56 and to the anode of diode 68.

A second transistor 100 has its collector 102 connected to junction 36 and to line 28 through a variable resistor 104 and a resistor 106. The base 108 is connected to the junction of resistor 76 and the collector 58 of the first transistor 56. The emitter 110 is connected to ground through a resistor 112 and to the base 114 of a third transistor 116 through a lead 118.

A fourth transistor 120 has its collector 122 connected to junction 40 in line 28 through a voltage divider comprising resistors 124 and 126. The emitter 128 is connected to a junction 130 which in turn is connected to line 46 through a resistor 132. A sensing capacitor 134 has one terminal connected to a junction 135 positioned between the resistor 104 and the collector 102 of transistor 100. The other terminal of the sensing capacitor 134 is connected to emitter 136 of transistor 116 and to the junction 130 via lead 138. The collector 140 of transistor 116 is connected to junction 38 of line 28 through a resistor 142 and to the base 144 of transistor 120 through lead 146. A Zener diode 150 is connected across the emitter 110 and collector 108 of the transistor 100 by having its cathode connected to junction 135 and its anode connected to lead 118.

A fifth transistor 152 has its base 154 connected to a junction between resistors 124 and 126 that are connected between junction 40 in line 28 and the collector 122 of transistor 120. The emitter 156 is connected to lead 78 and to the anode of diode 80 through a lead 157. The collector 158 of transistor 152 is connected to line 46 through resistors 160 and 162.

A sixth transistor 164 has its base 166 connected to the junction between resistors 160 and 162, its emitter 168 connected to line 46, and hence to ground, through lead 170 and its collector 172 connected to one terminal 174 of an inductor 176 in the form of a primary winding of a transformer 178. The other terminal 180 (dot marked) of the primary winding or inductor 176 is connected to junction 44 through lead 182 and hence to the positive terminal 30 of battery 26.

The secondary winding 184 of transformer 178 has one terminal (dot marked) 185 connected to the anode of diode 186 and the other terminal 187 connected to a junction 188 through lead 190. A storage capacitor 192 has one terminal or plate connected to the junction 188 and the other terminal or plate connected to the anode of the diode 186 through the leads shown and a junction 194. The junction 188 is connected to lead 196 and, therefore, to one output terminal, the anode 198, of a solid state switching device 200, preferably in the form of a silicon controlled rectifier. The other output terminal 202, the cathode, of the solid state switching device 200 is connected to line 46 through lead 204. The gate or control electrode 206 of the solid state switching device 200 is connected to the collector 158 of the transistor 152 through a diode 208 and a capacitor 210. One terminal or plate of the capacitor 210 that is connected to the diode 208 is also connected to ground or line 46 through a resistor 212, while the other terminal of capacitor 210 that is connected to gate or control electrode 206 is also connected to ground or line 46 through resistor 214.

A diode 220, a resistor 222 and primary winding 224 of ignition coil 226 are connected in parallel between leads 228 and the line 46. The lead 228 is connected to the junction 194 through lead 230. The secondary winding 232 of the ignition coil 226 has one terminal connected to the lead 228 and the other terminal (dot marked) connected to the rotating arm 16 of the distributor 18 through lead 234.

Additionally, a capacitor 236 is connected across lines 28 and 46 and hence across the primary circuit described above and the battery 26 to filter out any transient voltages that may be generated at the junction 44, by the battery 26 and the remainder of the vehicle electrical system.

Referring now to FIGURE 2 there is shown a partial modification of the circuit shown in FIGURE 1 in which a Darlington pair of transistors to form a Darlington amplifier are employed to control current through the inductor 176 which forms the primary winding of transformer 178. This Darlington pair comprises transistor 164 and an additional transistor 238. The collector 172 and the emitter 168 of transistor 164 are connected in series with the inductor or the primary winding 176 of transformer 178, as shown in FIGURE 1, while the base 166 is connected to the emitter 248 of transistor 238. The collector 250 of transistor 238 is connected to the collector 172 of transistor 164 and to the inductor or primary winding 176 of transformer 178, while the base 251 is connected to the junction of the resistors 160 and 162. The use of the Darlington pair permits raising of the impedance level in the input circuit to them. That is, it permits the values of resistors 126 and 160 to be increased thereby significantly lowering internal power dissipation. Transistor 152 could then be a small signal transistor, and smaller than that employed in the circuit shown in FIGURE 1.

The electrical generator 11 employed with the circuit shown in FIGURE 1 may be the electrical generator fully described and claimed in U.S. Patent 3,299,875, issued Jan. 24, 1967 to Frank Skay and assigned to the assignee of this invention. FIGURE 3 of the present invention shows a part of this electromechanical generator. It includes a stator 252 that has an annular permanent magnet 253 that may be constructed of barium titanite positioned concentrically about a distributor shaft (not shown). An annular magnetic flux gate element 254 is positioned in radially spaced relationship with respect to the permanent magnet 253. This magnetic flux gate element is constructed of any suitable ferromagnetic material. An annular output winding 12 is positioned radially outwardly from the magnetic flux gate element 254, and is enclosed in a bobbin 256 constructed of a plastic material that separates or spaces the magnetic flux gate element 254 from the annular output winding 12. The three annular elements, the annular permanent magnet 253, the annular flux gate 254, and the annular output winding 12 including the bobbin 256, are positioned between a lower plate 261 and an upper plate 262 constructed of magnetic material. The two plates 261 and 262 are held between shoulders 264 and 265 of a bushing 266.

The plate 261 has a peripheral flange 268 that has a plurality of teeth 271 equally spaced about its periphery. The number of teeth 271 corresponds to the number of spark plugs employed in the engine, and as shown in FIGURE 1, the distributor 18 and electromechanical generator 11 are designed for an internal combustion engine of eight cylinders that employs eight spark plugs. The upper plate 262 also has a plurality of teeth 272 that correspond in number to the number of teeth 271 and to the number of cylinders and spark plugs of the engine. The teeth 272 are spaced radially inwardly from the teeth 271 and have one edge in approximate alignment with respect to one edge of the teeth 271.

The rotor 275 of the electromechanical generator 11 includes a rotatable plate member or armature 276 that has a number of shaped teeth 277 that correspond in number to the number of teeth 271 in the plate 261 and to the number of teeth 272 on the plate 262.

The electrical mechanical generator shown in FIGURE 3 also has an input shaft 281 which will rotate the rotor 275 with respect to the stator 252. As a result, the electromagnetic path is altered by the teeth 271, 277 and 272 to cause a changing flux in the winding 12, the result of which is to cause the winding 12 to produce an alternating output voltage as fully explained in the above mentioned patent. This alternating current voltage is shown in FIGURE 4 and is designated by the numeral 282. The loading on the output winding 12 caused by certain of the components shown in FIGURE 1, including resistors 90 and 92, diodes 68, 84 and 86, and the input impedance of transistor 56 shown in FIGURE 1, causes this output voltage wave form to be distorted so that it appears as shown at 284.

FIGURE 5 of the drawing shows an analog of the primary circuit shown in FIGURE 1 with the terminals 30 and 52 of battery 26 being connected across or in parallel with a series circuit comprised of the inductance of primary winding 176 of the transformer 178 and the resistance $R_1$ in the primary winding circuit being designated by the numeral 290. The dual of this circuit comprising the resistance 290 ($R_1$) and the inductance 176 is represented by the sensing capacitor 134 and a resistance $R_2$ comprising the series connected resistors 104 and 106. A further explanation of this analog circuit will be given subsequently.

It is believed that the operation of the invention can be best understood by assuming that the capacitor 192 connected in series circuit with the output terminals, anode 198 and cathode 202, of the solid state switching device or silicon controlled rectifier 200 and the primary winding 224 of ignition coil 226 is in its fully charged state ready to deliver electrical energy to the primary winding 224. The charging of this capacitor will be explained subsequently. The capacitor is charged so that the upper plate, connected to junction 194, is negative and the positive plate connected to junction 188 is positive. It can be readily appreciated that the diode 186 will, therefore, be biased in a reverse direction holding the charge on the capacitor 192. Additionally, the silicon controlled rectifier 200 will be in a nonconducting state and the diode 220 will be reverse biased. The charge cannot leak off the plate connected to junction 194 through resistor 222 since this resistor 222 is connected to line 46 and hence to ground or the negative terminal 52 of battery 26. In order for the capacitor 192 to discharge its energy through the primary winding 224 of ignition coil 226, therefore, it is necessary to bring the solid state switching device or silicon controlled rectifier 200 into its conducting state.

In this condition the time on the voltage time curve in FIGURE 4 is at zero and the voltage output at the terminal 64 of the winding 12 of electromechanical generator 11 will be zero. Under these conditions the transistor 56 is biased to a level just below its conductive state by its biasing network including diode 80 connected to junction 42, line 78 and resistor 76 connected to collector 58.

The transistor 100, on the other hand, is biased into a conducting state since positive potential is applied to the base 108 via resistor 76 and diode 80, and a positive potential is applied to the collector 102 through resistors 104 and 106. The current flow through the base-emitter junction of transistor 100 flows into the base 114 of transistor 116 thereby bringing transistor 116 into its conducting state. With the transistor 100 in its conducting state, the voltage charge on capacitor 134 is held to a small minimum level; and the current through the collector 102 and emitter 110 of transistor 100 adds to the base current drive of transistor 116 thereby switching it into its full conducting state.

Transistors 120, 152 and 164 at this time are all in their nonconducting states. Transistor 120 is held in a non-conducting state because current that might otherwise flow into the base 144 is shunted through the collector 140-emitter 136 circuit of transistor 116. With the transistor 120 in its nonconducting state, no base current may flow out of transistor 152 and it, therefore, is in a nonconducting state. With transistor 152 in a nonconducting state, no base current can flow into the base 166 of transistor 164 and, as a result, it is in its nonconducting state.

As previously stated this condition exists when the voltage shown by curve 284 in FIGURE 4 is at the zero level or below a certain threshold voltage, indicated by the dotted line, that is necessary to switch transistor 56 to its conducting state. As the voltage output at terminal 64 of winding 12 slowly increases, it is applied through diode 68 to the base 62 of transistor 56 thereby switching transistor 56 to its conducting state. When this happens current is shunted away from the base 108 of transistor 100 through the collector 58-emitter 60 circuit of transistor 56 thereby reducing current flow from emitter 110 of transistor 100. This reduces the current flow into base 114 of transistor 116 thereby turning transistor 116 toward its nonconducting state. As a result, current flow through the resistor 142 from junction 38 will flow into base 144 of transistor 120 thereby switching transistor 120 into a conducting state. The switching of transistor 120 into a conducting state drives the emitter 136 of transistor 116 more positive which further drives transistor 116 into its fully nonconducting state through a typical Schmitt trigger action. The switching of transistor 120 into its conducting state permits current flow out of base 154 of transistor 152 thereby switching it into its conducting state. Moreover, current flow through the emitter 156-collector 158 circuit of transistor 152 permits current flow into the base 166 of transistor 164 thereby switching it to its conducting state. The switching of transistor 164 to its conducting state permits current to commence building up in the inductor 176, the primary winding of transformer 178.

When transistor 152 is switched to its conducting state, a positive pulse appears at the junction between resistor 160 and the collector 158 of this transistor. This positive pulse is of rectangular form and is applied through diode 208 and capacitor 210 to the gate 206 of solid state switching device or silicon controlled rectifier 200. The capacitor 210 differentiates this rectangular pulse into a spike of positive voltage and a spike of negative voltage. The spike of positive voltage switches the silicon controlled rectifier 200 to its conducting state and the spike of negative voltage permits the gate 206 of silicon controlled rectifier to regain control sooner than if the gate were resistively coupled to the collector 158 of transistor 152.

When the silicon controlled rectifier 200 is switched to its conducting state, the electrical energy stored in the capacitor 192, as previously stated, is discharged through the anode 198 and cathode 202 of the solid state switching device or silicon controlled rectifier 200 and through the primary winding 224 of ignition coil 226. A return path is provided through lead 228, lead 230 and junction 194 to the plate of capacitor 192 that was charged in a negative direction. The diode 220 and resistor 222 connected across the primary winding 224 of ignition coil 226 prevents oscillations between the capacitor 192 and the primary winding 224 of ignition coil 226 thereby preventing a reverse voltage across the output terminal, anode 198 and cathode 202 of the solid state switching device or silicon controlled rectifier 200. This lengthens the period of discharge of current through the primary winding 224, by preventing premature switching of the solid state switching device or silicon controlled rectifier 200 to its nonconducting state before capacitor 192 is fully discharged.

It can be appreciated that positive current flows into the unmarked terminal of the primary winding 224 thereby causing a plus-to-minus voltage across the primary winding with the dot-marked terminal being negative. The energy in the primary winding 224 is transformed to the secondary winding 232 and a negative voltage appears at the dot-marked terminal of this secondary winding. This negative voltage is applied through lead 234 to the rotating arm 16 of distributor 18 that will at this time be in contact with one of the contacts 20. As a result, this negative voltage is applied to the center electrode of one of the spark plugs 24 to fire the combustible mixture contained within one of the cylinders of the internal combustion engine.

As was stated earlier, during the above described operation the transistors 100 and 116 are driven into their nonconducting states and transistor 164 is switched into its conducting state. When transistor 164 is switched to its conducting state, current begins building up in the inductor or primary winding 176 of transformer 178. The total series resistance of the circuit from junction 44 to line 46, i.e., the resistance of lead 182, inductor or primary winding 176, the lead connecting terminal 174 to collector 172, the emitter collector circuit of transistor 164 and lead 170, is held intentionally small. As a result, the linear charge of current in the inductor or primary winding 176 is represented by the equation $di/dt=V/L$. Unless the generated signal voltage, as represented by the curve 284 in FIGURE 4, decreases to turn the transistor 56 to its nonconducting state, the current in the inductor or primary winding 176 continues to increase linearly. Simultaneously, the capacitor 134 connected between the junction 135 at collector 102 of transistor 100 and the emitter 136 of transistor 116 is also being charged almost linearly during the initial fraction of the time constant represented by the value of the resistors 106 and 104 and the value of the capacitor 134. It can be appreciated that at this time transistors 100 and 116 are in their nonconducting states so that current flows into the capacitor 134 through the resistors 106 and 104 that are coupled to the positive terminal 30 of battery 26 through lead 32, line 28 and junction 36. This capacitor will be charged so that the plate connected to the collector 108 of transistor 100 is positive and the plate connected to the emitter 136 of transistor 116 and to the junction 130 is negative.

It will also be remembered that the Zener diode 150 is positioned in the reverse direction across the emitter collector circuit of transistor 100 and has its anode connected to line 118, one end of which is connected to the base 114 of nonconducting transistor 116 and the other end connected to the junction of resistor 112 and emitter 110 of transistor 100 which is also nonconducting. As the Zener breakdown voltage of Zener diode 150 is reached, which is small compared to any voltage appearing across battery 26, it breaks down, current flows through it in the reverse direction and into the base 114 of transistor 116 thereby switching transistor 116 to a conducting state. This in turn, through the action previously described, turns transistor 120 off since the base current into the base 144 is diverted through the collector 140-emitter 136 circuit of transistor 116. When transistor 120 is turned off or switched to its nonconducting state, transistors 152 and 164 are similarly switched to the nonconducting states since current may no longer flow out of the base of transistor 152 or into the base 166 of transistor 164.

When transistor 164 is switched to its nonconducting state, current is interrupted through the inductor or primary winding 176 of transformer 178 and the inductively stored electrical energy in the primary winding 176 is transferred to capacitor 192 at a higher voltage level due to the turns ratio of the primary winding 176 to the secondary winding 184. As current is interrupted in the inductor or primary winding 176, the voltage across it reverses so that the dot-marked terminal now becomes negative. The dot-marked terminal of the secondary winding 184, therefore, becomes negative and the unmarked terminal becomes positive. This charges the capacitor 192, as previously state, so that the plate connected to junction 188 is positive and the plate connected to junction 194 is negative. The maximum voltage across the capacitor is, of course, limited to the energy stored in the inductor or primary winding 176 of the transformer 178. The energy transfer relationship is represented by the equation $\frac{1}{2}CV^2=\frac{1}{2}LI^2$ where C is the value of the capacitance of capacitor 192, V is the voltage stored across it, L is the inductance of the inductor or primary winding 176 and I is the value of the current through it when the current is interrupted.

It can be appreciated that when the capacitor 192 commences to charge, a forward voltage is applied across the output terminals, anode 198 and cathode 202, of the solid state switching device or silicon controlled rectifier 200. This is true since the anode 198 is connected through lead 196 and junction 188 to the plate of capacitor 192 that is being charged positively from the secondary winding 184 of the transformer 178. During this initial application of forward voltage to the solid state switching device or silicon controlled rectifier 200, the gate 206 is reverse biased by the negative pulse resulting from the differentiation of the rectangular pulse appearing at the collector of transistor 152 when transistor 152 is switched to a conducting state. Moreover, when the current is cut off thorugh the inductor or primary winding 176 of the transformer 178 and the capacitor 192 commences to charge, the transistor 152 is in a nonconducting state and hence its collector 158 is close to ground potential which applies additional negative bias through the capacitor 210 to the gate 206. This negative voltage or reverse bias applied to the gate 206 permits a higher $dv/dt$ rate to be applied to the capacitor 192 and hence permits it to charge at a more rapid rate. The resistors 212 and 214 divide the voltage across the capacitor 210 during the turning off cycle of the solid state switching device or silicon controlled rectifier 200 so that the reverse gate voltage on the gate 206 is held to acceptably low levels.

The diode 208 decouples the capacitor 210 from the input of transistor 164. This prevents the positive charge that may be present on the capacitor 210 from holding transistor 164 in its conducting state when it is being switched to its nonconducting state through the circuits previously described to interrupt current flow through the inductor or primary winding 176 of transformer 178.

It can be appreciated that the capacitor 134 remains charged during the time that transistor 164 is in its nonconducting state and energy is being transferred in accordance with the above mentioned equation from the inductor or primary winding 176 of transformer 178 to the capacitor 192. It can also be appreciated that while capacitor 192 is being charged, transistors 100, 120, 152 and 164 are all in their nonconducting states. After the energy stored in the inductor or primary winding 176 has been fully transferred to capacitor 192, the voltage output at the terminal 64, as represented by the curve 284 in FIGURE 4, will fall to a voltage level as represented by the dotted line where the transistor 56 is switched back to its nonconducting state. This action restores base current into transistor 100 thereby switching it to its conducting state. The switching of transistor 100 into its conducting state reinforces base current into base 114 of transistor 116 thereby increasing its conduction. The capacitor 134 may then discharge through junction 135, the collector 102-emitter 110 circuit of transistor 100, resistor 112, resistor 132, and lead 138 thereby reducing the charge to a very small value. The circuit is now in its initial condition again and is ready for another cycle of operation when the voltage wave form 284 goes through its negative cycle and then again reaches a positive level represented by the dashed line in FIGURE 4.

During high engine speed operation above a predetermined speed level the dwell time of the electrical generator 11, as represented by time on curve 284 when the voltage rises to cross the dotted line until it decreases to cross the dotted line, may be shorter than the inductive charge time desired for the primary winding 176 to reach its desired full energy storage level. Under these conditions the input from the electromechanical generator 11 functions to switch the current through the inductor or primary winding 176 on and off and continues the charge and discharge cycles of the storage capacitor 192 but at a correspondingly lower voltage level. The rate at which the voltage across the capacitor, and hence the voltage to the spark plugs, falls off as the speed increases above a certain predetermined speed is no worse than a conventional ignition system although full output in the present system is sustained over a much greater speed range than that of a conventional breaker-point ignition system. This situation is considered satisfactory inasmuch as the internal combustion engine requires less sparking voltage at higher speeds and temperatures and this feature also limits power dissipation at high speeds. It can be appreciated that proper timing relationships are maintained over the entire speed range.

The modification to the circuit described above and shown in FIGURE 2 operates in the same way as the circuit shown in FIGURE 1. The Darlington transistor 238 provides greater amplification between transistors 152 and 164 and it thereby permits raising the impedance level of the driver circuit represented by the resistors 160 and 162 above the impedance of this circuit, as shown in FIGURE 1, thereby significantly lowering internal power dissipation. Transistor 152 could, therefore, become a smaller signal transistor so that the net cost of adding the Darlington connected driver transistor would be only that of an additional small transistor. This represents a very reasonable cost trade-off for the benefits obtained.

In the ignition system described, each pulse of ignition energy is derived from a single surge of current into the inductor or primary winding 176 of the transformer 178 from the source of electrical energy or storage battery 26. This energy charge is regulated to a constant value over a wide range of input voltages, that is, input voltages from the source of electrical energy 26 which may vary over wide ranges. During cold cranking operations this input voltage may fall to a level of five volts if a 12 volt battery is employed. On the other hand, after the vehicle has been operating for a considerable period of time and all components, including the battery 26, are up to full operating temperature, the input voltage from the battery 26 may reach the highest regulated voltage supplied by an alternator connected to it. This voltage will be in the neighborhood of 14 to 15 volts. In the present system the energy charge in the inductor or primary winding 176 of transformer 178 is regulated over very wide ranges of these input voltages to provide a substantially constant value of energy charges delivered to the spark plugs.

This is accomplished by interrupting the current through the inductor or primary winding 176 when the voltage on the capacitor 134 reaches a predetermined level. It will be remembered that when this voltage across the capacitor 134 reaches a predetermined level, the Zener diode 150 will breakdown and will cause the transistors 120, 152 and 164 to be switched to their nonconducting states thereby interrupting current in the primary winding 176.

Fundamentally, the energy charge in the primary winding 176 will be regulated if the peak inductive charging current is regulated to a constant value at the instant that this current is cut off. Direct current sampling of this inductive current is known in the prior art. The present invention, however, simulates this sampling as if obtained by a sampling resistor connected in series with inductor 176, but without using such a resistor. This is accomplished by the use of the capacitor 134, and an explanation of the selection of proper values can be better understood by reference to FIGURE 5. This figure shows the primary circuit analog which consists of the battery 26, a switch 286, the inductor 176 and a resistance 290 ($R_1$) which comprises lumping all wiring and winding resistance in the series circuit including the inductor 176. Upon closure of the switch 286 which simulates switching the transistor 164 into a conducting state, the current through the inductance 176 builds up exponentially according to:

$$i_L = \frac{V}{R_1}(1-\epsilon^{-t/\tau_1})$$

where $\tau_1$ is the $L/R_1$ time constant. The desired peak primary current, $\hat{I}_L$, is reached in time $T_1$.

$$\hat{I}_L = \frac{V}{R_1}(1-\epsilon^{-T_1/\tau_1})$$

Solving for this time period $T_1$:

$$T_1 = -\tau_1 \ln\left(1 - \hat{I}_L \frac{R_1}{V}\right)$$

If during this same time the input voltage were applied to an uncharged capacitor, capacitor 134, through a resistor, resistors 104 and 106, the capacitor voltage appears as a similar exponential.

$$v_c = V(1-\epsilon^{-t/\tau_2})$$

where $\tau_2$ is the RC time constant product. The capacitor charges to $V_c$ in the same time period $T_1$.

$$V_c = V(1-\epsilon^{-T_1/\tau_2})$$

Again solving for $T_1$ $$T_1 = -\tau_2 \ln\left(1 - \frac{V_c}{V}\right)$$

Since this is the same time as the inductor charges $$-\tau_1 \ln\left(1 - \hat{I}_L \frac{R_1}{V}\right) = -\tau_2 \ln\left(1 - \frac{V_c}{V}\right)$$

which simplifies to:

$$\left(1 - \hat{I}_L \frac{R_1}{V}\right)^{\tau_1} = \left(1 - \frac{V_c}{V}\right)^{\tau_2}$$

Since the capacitor and its charging resistor may be selected arbitrarily let us choose their time constant to equal the inductive charging time constant, $$\tau_1 = \tau_2 \text{ or } \frac{L}{R_1} = R_2 C$$

Then:

$$\left(1 - \hat{I}_L \frac{R_1}{V}\right) = \left(1 - \frac{V_c}{V}\right)$$

Or:

$$\hat{I}_L R_1 = V_c$$

which states that the voltage charge on the capacitor equals the drop caused by the inductive current flowing through the entire series resistance (which may all be unintentional). A threshold detector, Zener diode 150, across the capacitor set to interrupt the inductive current when $V_c$ is reached will effectively regulate the energy charge independently of the input voltage (which cancels out of the equations).

The constraint imposed above that the time constants be equal is not crucial except for theoretically "perfect" regulation. It can be shown that if the time constants are unequal the input voltage no longer cancels out but causes the current trip level to vary with the applied voltage. Furthermore, either a positive or negative voltage coefficient of energy may be obtained depending on whether $R_2 C > L/R_1$ (positive) or $R_2 C < L/R_1$ (negative).

Practical considerations to be made follow that the capacitor be reset to zero charge or to some negligibly small voltage in order to recycle to the same energy level. Also in the case of unequal time constants the threshold detector, Zener diode 150, across the capacitor must be below the lowest input voltage ever encountered or the regulator will fail to function.

The circuit disclosed in FIGURE 1 with typical values as shown works very satisfactorily between five and 20 (or more) volts with a slightly negative voltage coefficient of energy (a lower energy at high inputs or higher energy at lower than normal applied voltage).

Typical parts list

Capacitor 236—40 μfd. 50 v.
Capacitor 98—.005 μfd. ceramic disc
Capacitor 134—1.0 μfd. 35 v. tantalum
Capacitor 210—.05 μfd. ceramic disc
Capacitor 192—1.0 μfd. 600 v. metalized paper
Diode 68—IN4002
Diodes 72, 86, 80 and 208—IN4001
Diode 150—MZ500-1 2.4 v. Zener
Diode 186—IN4005
Diode 270—MR1034B
Transistors 56, 100, 116 and 120—MPS6531
Transistor 152—MJE371
Transistor 164—MJ2802
Resistor 82—1500 ohm ½ w.

Typical Parts List—Continued

Resistors 72, 106 and 112—8200 ohm ½ w. optional 10K
Resistor 76—12K ohm ½ w.
Resistor 104—5000 ohm variable
Resistor 142—1500 ohm ½ w.
Resistor 164—270 ohm ½ w.
Resistor 126—100 ohm 2 w.
Resistor 132—22 ohm ½ w.
Resistor 160—10 ohm 11 w.
Resistor 162—27 ohm ½ w.
Resistor 212—2200 ohm ½ w.
Resistor 214—220 ohm ½ w.
Resistor 220—600 ohm 5 w.
SCR 200—2N4443 Thyristor
Transformer 178—Osborne Special #24573 E. I laminated stock primary 60 turns #18; secondary 480 turns #27 on ¾ x ¾ center leg
Ignition coil 226—Special spark coil winding primary 75 turn #21; secondary 8000 to 10,000 turns #40

For the Darlington connected circuit, shown in FIGURE 2, change the following parts' values:

Transistor 152—MPS 6534
Transistor 238—MJE 521
Transistor 164—MJ2802
Resistors 124 and 126—470 ohm ½ w.
Resistor 166—100 ohm 2 w.
Resistor 162—220 ohm ½ w.

The breakdown value of the Zener diode 150 should be set as indicated below the lowest input voltage received from the battery 26, and in a practical system, a Zener diode may be used having a 2.4 volt breakdown. This also permits the transient curves or the time charging curves of the inductor 176 and the capacitor 134 to operate in their linear regions thereby providing excellent control over the charging current in the inductor 176 to substantially constant values irrespective of the input voltage from the battery 26. The voltage across the Zener diode reaches its breakdown voltage at the same time that the desired energy current level is reached in the inductor or primary winding 176 of the transformer 178. As a result, a constant charge or voltage across the capacitor 192 is achieved and a constant voltage output from the secondary winding 232 of ignition coil 226 which is applied to the spark plugs 24 is achieved over wide ranges of input voltage.

The present system thus simulates the inductive current charging function in the inductor or primary winding 176 of transformer 178 with a capacitive voltage charging function in the capacitor 134 thereby eliminating any need for a sensing resistor in the series circuit including the inductor or primary winding 176 of the transformer 178. Also, the signal or the charge on the capacitor 134 will remain and will not be lost as soon as the current through the inductor or primary winding 176 is cut off by switching the transistor 164 into its nonconducting state. Quite to the contrary, this voltage will remain stored on capacitor 134 until transistor 100 is switched to its conducting state by the input signal from the electrical generator 11, and this provides the very definite advantage that the signal is present to maintain stability in the system throughout its desired operating period.

It can be fully appreciated that this system has a very important advantage inasmuch as the energy in the inductor or primary winding 176 of transformer 178 is transferred to the capacitor 192 as soon as the current in the windings 176 is cut off. The timing of this curent cutoff is unimportant inasmuch as the energy is immediately transferred to the capacitor 192 to await discharge through the primary winding 224 of the ignition coil at the appropriate time determined by the input signal from the electrical generator 11.

The present invention also eliminates difficulties that were encountered in previous capacitive discharge systems. In some prior systems a transient during the capacitor discharge cycle, i.e., sparking time would prematurely switch off the primary circuit of the system thus preventing the next energy charge into the inductor or primary winding 176 of transformer 178 from being stored. The present invention eliminates such a problem by direct coupling throughout and the effective transient suppression achieved by integrating the energy charge via the capacitor 134. Moreover, the turn-off signal from the electromechanical generator 11 is fed into the primary circuit through the input of the Schmitt trigger circuit of tansistors 100 and 116 thereby permitting even a slowly varying signal to provide effective switching of the primary circuit to the off condition very rapidly. This minimizes switching losses in the power transistor. Additional stability is achieved also by sustaining the off signal, i.e., the voltage on capacitor 134, during the turn-off cycle, while the storage capacitor 192 is being charged.

Thus, the present invention provides a very reliable, stable and uncomplicated electronic capacitive discharge ignition system. The invention also provides a substantially constant energy charge to the energy storage capacitor over wide ranges of supply voltages and over wide ranges of engine speeds.

What is claimed is:

1. An ignition system for an internal combustion engine comprising a spark plug, a source of direct current electrical energy, an inductor connected in series with said source of direct current electrical energy and adapted to be charged to a predetermined current level for providing a predetermined energy charge to the spark plug, switch means coupled to said inductor for interrupting current through said inductor, a capacitor connected to said source of electrical energy, means coupled to said capacitor for limiting the voltage across said capacitor to a predetermined voltage level lower than the voltage of said source of direct current electrical energy, means coupled to said capacitor and said source of electrical energy for causing said capacitor to charge to said predetermined voltages level at the same time the current through said inductor reaches the predetermined level, and means coupled to said switch means, said capacitor and said means coupled to said capacitor for limiting the voltage across said capacitor, for operating said switch means to interrupt current through said inductor when the predetermined voltage across said capacitor is reached.

2. The combination of claim 1 including capacitive storage means and transfer means coupled to said inductor and said capacitive storage means for transferring the electrical energy in said inductor to said capacitive storage means when current through said inductor is interrupted.

3. The combination of claim 2 in which said ignition system includes an ignition coil having a primary winding and a secondary winding, a solid state switching device having output terminals connected in series with said primary winding and said capacitor storage means, said solid state switching device having a control electrode, means adapted to be operated by the internal combustion engine for applying a control signal to said control electrode in timed relationship with the requirement of an energy charge at said spark plug, said control signal switching said solid state switching device to a conducting state whereby the energy stored in said capacitive storage means is discharged through said primary winding of said ignition coil.

4. The combination of claim 3 comprising means coupled to said capacitor and said source of electrical energy for preventing said capacitor to start charging toward said predetermined voltage level, and means coupling said last mentioned means and said means adapted to be operated by the internal combustion engine for causing said capacitor to commence charging toward said predetermined voltage level at approximately the same time said means adapted to be operated by the internal combustion engine applies the control signal to the control electrode of said solid state switching device.

5. An ignition system for an internal combustion engine comprising a plurality of spark plugs, an ignition coil having a primary and a secondary winding, a source of electrical energy, the terminal voltage of which may vary over wide limits, means operable in synchronism with the operation of the engine for sequentially coupling the secondary winding of said ignition coil with said spark plug, a capacitive storage device, a solid state switching device having output terminals and a control electrode, said primary winding of said ignition coil, said capacitive storage device and the output terminals of said solid state switching device connected in circuit, said solid state switching device being switched to a conducting state when a control signal is applied to said control electrode, said solid state switching device permitting said capacitive storage device to discharge through said primary winding of said ignition coil when switched to a conducting state and preventing discharge of said capacitive storage device through said primary winding of said ignition coil when in a nonconducting state, ignition actuating means operable in synchronism with the operation of the engine, an inductive means coupled to said source of electrical energy and means coupling said inductive means with said capacitive storage device, electronic circuit means coupled to said ignition actuating means, said inductor and said control electrode of said solid state switching device for applying a control signal to said control electrode of said solid state switching device when said secondary winding is coupled to one of said spark plugs, said electronic circuit means including means for permitting and interrupting current flow through said inductor, a capacitive means, means coupled to said source of electrical energy and said capacitive means for charging said capacitive means at a predetermined time rate, and means coupled to said capacitive means, and said means for permitting and interrupting current flow through said inductor for interrupting current flow through said inductor when said capacitive means is charged to a predetermined voltage level corresponding to a predetermined current level in said inductor, said predetermined voltage level being lower than the lowest terminal voltage of said source of electrical energy whereby a voltage is stored in said capacitive storage device, and the voltage stored in said capacitive storage device and the voltage delivered to said spark plug is substantially constant irrespective of wide variations of the terminal voltage of said source of electrical energy.

6. The combination of claim 5 in which said ignition actuating means comprises an electrical generator having an output winding coupled to said electronic circuit means, and including means for producing a periodically varying voltage having a magnitude greater than a predetermined magnitude for a given time in each period, the time for charging said capacitive means to said predetermined voltage level being less than said given time for engine speeds up to a predetermined speed level in the higher speed ranges of the engine, whereby the voltage applied to said capacitive storage device and the voltage applied to said spark plugs is substantially constant for engine speeds up to said predetermined speed level.

7. The combination of claim 6 in which said means for permitting and interrupting current flow through said inductor comprises a transistor having output terminals connected in series with said inductor and an input circuit coupled to said capacitive means, the series circuit of said inductor and said output terminals of said transistor being connected across said source of electrical energy.

8. The combination of claim 7 including a normally conducting transistor having an output circuit connected across said capacitive means and an input circuit coupled to said electrical generator, said transistor being switched to a non-conducting state when the output voltage of said electrical generator reaches said predetermined magnitude to thereby permit said capacitive means to commence charging, and a Zener diode coupled to said capacitor means and poled in a direction to prevent current flow therethrough as said capacitive means is charging, said Zener diode having a reverse breakdown voltage equal to said predetermined voltage level, said Zener diode also being coupled to the output of said transistor and to the input circuit of a second transistor in a direction to switch said second transistor to a conducting state when said Zener diode breaks down and current flows through it, and means coupled to said output circuit of said second transistor and the input circuit of said transistor connected in series with said inductor for switching said last mentioned transistor to a non-conducting state when said second transistor is switched to a conducting state.

9. The combination of claim 8 in which said transistor having its output circuit connected to said capacitive means is switched to a conducting state when the output voltage of said electrical generator falls below said predetermined magnitude thereby providing a discharge path for said capacitor means whereby the predetermined voltage is maintained on said capacitive means for a period of time after current through said inductor is interrupted.

10. The combination of claim 9 in which said means coupled to the output circuit of said second transistor and the input circuit of said transistor connected in series with said inductor includes means coupled to the control electrode of said solid state switching device, and means coupled to said first mentioned transistor and said second mentioned transistor for switching said second transistor to a non-conducting state when said first transistor is switched to a non-conducting state as the voltage from said electrical generator rises to said predetermined magnitude, said means coupled to the input circuit of said transistor connected in series with said inductor and the output circuit of said second transistor for applying the control signal to said solid state switching device when said transistor connected in series with said inductor is switched to a conducting state.

11. The combination of claim 10 in which said means coupled to the control electrode of said solid state switching device and the input circuit of said transistor connected in series with said inductor comprises a differentiating capacitor and a diode coupled in series circuit, said capacitor connected to said control electrode and said diode connected to the input circuit of said transistor connected in series with said inductor, said diode being poled to permit a positive pulse of electrical energy to be applied to said capacitor and said control electrode and preventing said capacitor from discharging into the input circuit of said transistor connected in series with said inductor.

References Cited

UNITED STATES PATENTS 3,312,211    4/1967    Boyer.
3,372,682    3/1968    Phillips et al.
3,377,998    4/1968    Adams et al.

LAURENCE M. GOODRIDGE, Primary Examiner

U.S. Cl. X.R.

315—209